United States Patent [19]
Greenberg et al.

[11] Patent Number: 5,793,352
[45] Date of Patent: Aug. 11, 1998

[54] SOURCE COUPLER FOR MULTIMEDIA PROJECTION DISPLAY SYSTEM

[75] Inventors: Robert Y. Greenberg; Jorell A. Olson; Gerald E. Duffy; Mark E. Schoening, all of Portland, Oreg.

[73] Assignee: In Focus Systems, Inc., Wilsonville, Oreg.

[21] Appl. No.: 612,348

[22] Filed: Mar. 7, 1996

Related U.S. Application Data

[63] Continuation-in-part of Ser. No. 551,344, Nov. 1, 1995, abandoned.

[51] Int. Cl.$^6$ .................................................. H01B 11/02
[52] U.S. Cl. ........................... 345/132; 361/827; 439/143
[58] Field of Search ................................ 345/1, 2, 4, 5, 345/156, 87, 132; 361/681-83, 728-32, 827; 395/500, 882-83, 892, 501, 128, 520, 807, 806; 439/136, 142, 149, 217-18, 222, 638-39, 650, 143

[56] References Cited

U.S. PATENT DOCUMENTS

| | | | |
|---|---|---|---|
| 5,159,683 | 10/1992 | Lvovsky et al. | 395/500 |
| 5,276,436 | 1/1994 | Shaw et al. | 340/703 |
| 5,289,339 | 2/1994 | Akashi et al. | 361/684 |
| 5,307,055 | 4/1994 | Baskin et al. | 345/1 |
| 5,387,110 | 2/1995 | Kantner et al. | 439/59 |
| 5,404,149 | 4/1995 | Joliey | 345/1 |
| 5,430,554 | 7/1995 | Konakai | 358/409 |
| 5,526,011 | 6/1996 | Hix et al. | 345/87 |
| 5,557,691 | 9/1996 | Izuta | 382/299 |

OTHER PUBLICATIONS

Proxima Corporation, Proxima Desktop Projector (Model DP2800), Apr. 1994, Publication #710-00401-2A, San Diego, CA, pp. 1-3, 2-11.

*Primary Examiner*—Mark R. Powell
*Attorney, Agent, or Firm*—Timothy M. Carlson

[57] ABSTRACT

The present invention includes a multimedia projection system coupling apparatus having a coupling converter for interconnecting at least one multimedia source and a multimedia projection display system. The coupler system includes at least two source cables that extend from the multimedia source and carry to the coupling converter media signals corresponding to different media, such as video and system control. The coupling converter delivers corresponding media signals to a projector terminal from which a projector cable extends to the projection display system. In the preferred embodiment, the coupling converter includes signal format conversion circuitry for converting each media signal or its component to a differential signal format, and the projector cable preferably includes a separate twisted pair of wires for carrying each of the differential format signals.

34 Claims, 7 Drawing Sheets

SOURCE COUPLER FOR MULTIMEDIA PROJECTION DISPLAY SYSTEM

This is a continuation-in-part of application Ser. No. 08/551,344, filed Nov. 1, 1995, now abandoned.

FIELD OF THE INVENTION

This invention relates generally to multimedia projection display systems and, more particularly, to a source coupler for interconnecting a multimedia projection display system and a multimedia source such as a personal computer.

BACKGROUND OF THE INVENTION

Presentations using multimedia projection display systems are given for a variety of purposes including sales demonstrations, business meetings, and classroom sessions. In a common mode of operation, multimedia projection display systems receive image display or video signals from a personal computer. The video signals represent still, partial-, or full-motion display images of the type rendered by the personal computer. The video signals control a display object, such as a transmissive liquid crystal display (LCD), to form the display images for projection onto a display screen.

Two common types of multimedia projection display system are LCD projectors and LCD projection panels. A LCD projector includes a transmissive LCD, a light source, and projection optics to form and project display images in the manner described above. A LCD projection panel includes a similar transmissive LCD to form the display image, but operates with a conventional overhead projector (OHP) having a light source and projection optics, to project the display image onto a display screen. Examples of such LCD projectors and LCD projection panels are sold under the respective trademarks LITEPRO and PANELBOOK by In Focus Systems, Inc. of Wilsonville, Oreg., the assignee of the present application.

In addition to video signals, multimedia projection display systems also can utilize audio signals and system control signals, either from or to a personal computer or another media source. In particular, such multimedia projection display systems include audio speakers for generating audio accompaniment to video presentations. System control signals are transmitted between the multimedia projection display system and the personal computer system for controlling their interaction. For commonly used menu-driven user interfaces, the system control signals typically are pointer device or "mouse" control signals.

Conventional multimedia projection display systems accommodate up to three separate communication cables, one each for carrying an image display or video signal, an audio signal, and a system control signal. The cables for these different media have different terminals. In addition, the two main personal computer formats, the Macintosh format promulgated by Apple Computer Corporation and the PC format promulgated by International Business Machines, Inc., have different cable terminal configurations for video signals and system control signals.

To accommodate the different personal computer formats, manufacturers of multimedia projection display systems typically provide cable sets for a default personal computer format (e.g., PC) and a separate cable adapter for each of the incompatible terminal configurations of the other personal computer format. For users of the non-default personal computer format, the combination of cables and adapters is cumbersome and inconvenient. This is particularly so for users who travel with multimedia projection display systems.

Coupling a multimedia projection display system to a personal computer with multiple multimedia cables is unsightly and can be difficult and time-consuming for users. Moreover, such couplings between a multimedia projection display system and a personal computer typically require that cables be of lengths of no more than about 3 meters to prevent multimedia signal degradation from introducing unacceptable display degradation. Such short cable lengths require that the personal computer be placed relatively close to the projection display system. This limits the sizes and types of platforms (e.g., tables) on which the projection display system can be used and can exacerbate the cluttered and disorganized appearance of the equipment used with a projection display system.

SUMMARY OF THE INVENTION

The present invention includes a multimedia projection system coupling apparatus having a coupling converter for interconnecting at least one multimedia source and a multimedia projection display system. The multimedia source preferably is a personal computer of either a Macintosh format or a PC format, and the multimedia projection display system preferably is a LCD projector.

The coupler system includes at least two source cables that extend from the multimedia source and carry to the coupling converter media signals corresponding to different media, such as video and system control. The coupling converter delivers corresponding media signals to a projector terminal from which a single projector cable extends to the projection display system. The coupling apparatus of the present invention thus allows a single cable to carry all the media signals, thereby reducing the unsightly clutter and disorganization characteristic of conventional multiple cable connections.

In the preferred embodiment, the coupling converter includes signal format conversion circuitry for converting each media signal or its component to a differential signal format. The projector cable preferably includes a separate twisted pair of wires for carrying each of the differential format signals. The differential format signals are capable of propagating over lengths of up to at least 15 meters without appreciable signal degradation. Moreover, the differential format signals are capable of propagating together along the projector cable without appreciable crosstalk between them.

Referring to the preferred embodiment, the coupling converter includes video and system control terminals matched to those of both Macintosh and PC format personal computers, and each of the video and system control cables similarly includes terminal connectors matched to both Macintosh and PC format personal computers. The coupling converter eliminates the conventional requirement for different cables or adapters for use with these two types of multimedia source. The signal format conversion circuitry receives power via the projector cable to maintain a minimum number of cable connections.

The foregoing and other objects, features, and advantages of the invention will become more apparent from the following detailed description of a preferred embodiment which proceeds with reference to the accompanying drawings.

DETAILED DESCRIPTION OF PREFERRED EMBODIMENT

Figure 1:
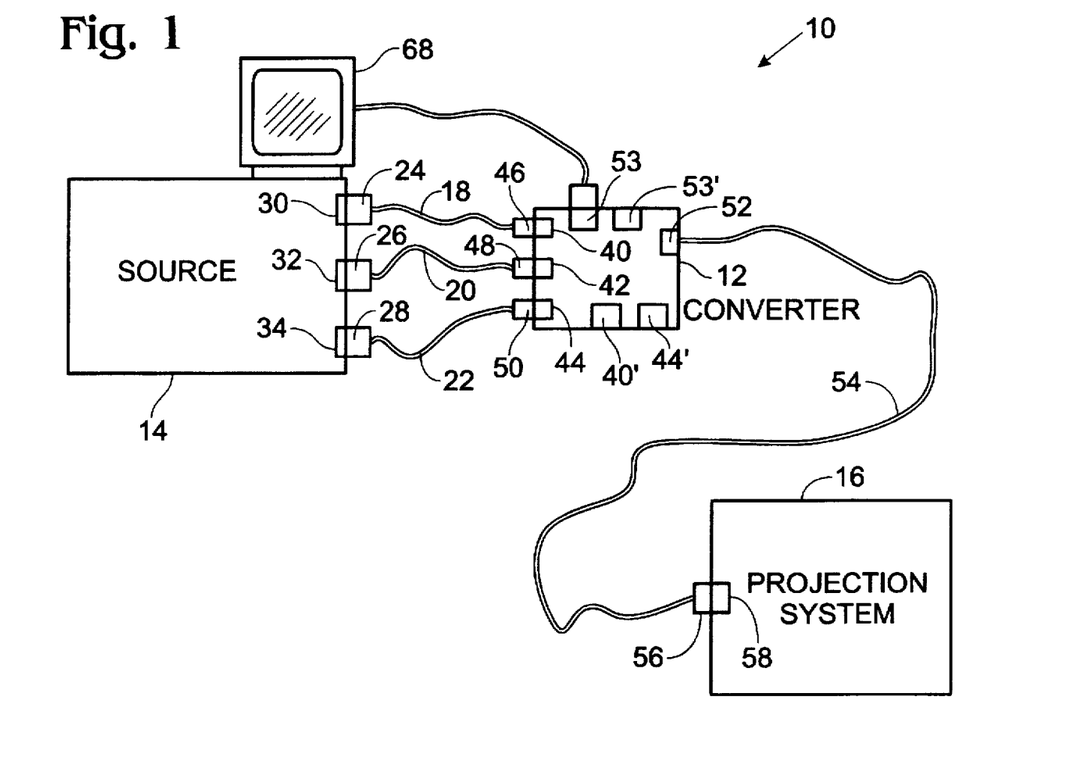
FIG. 1 is a block diagram of the coupler system according to a preferred embodiment of the present invention.

FIG. 1 shows a multimedia projection system coupling apparatus 10 having a coupling converter 12 for interconnecting at least one multimedia source 14 (only one shown) and a multimedia projection display system 16. Multimedia source 14 preferably is a personal computer of either a Macintosh format or a PC format, and multimedia projection display system 16 preferably is a LCD projector or a LCD projection panel. It will be appreciated, however, that multimedia projection display system 16 may employ any suitable electronic display format or technology, including technologies under development such as digital micromirror systems and laser diode systems.

Three source cables 18, 20, and 22 have respective terminal connectors 24, 26, and 28 coupled to respective source terminals 30, 32, and 34 of multimedia source 14. Source cables 18, 20, and 22 extend from multimedia source 14 and carry to coupling converter 12 different media signals in the form of video, audio, and system control signals, respectively. The system control signals control the interaction between multimedia source 14 and multimedia projection display system 16. With a preferred menu-driven user interface, the system control signals include pointer or "mouse" control signals.

Coupling converter 12 has terminals 40, 42, and 44 coupled to terminal connectors 46, 48, and 50 of source cables 18, 20 and 22, respectively. Coupling converter receives the video, audio, and pointer control signals carried on respective source cables 18, 20, and 22 and delivers corresponding signals to a coupling terminal 52. A single projection system cable 54 extends between coupling terminal 52 and a projection system connector 56 coupled to a projection system terminal 58 of multimedia projection display system 16. Projection system connector 56 and terminal 58 are of a high density conductor configuration such as an IEEE 1284 configuration. Preferably, system cable 54 is fixedly connected to coupling terminal 52, and all other terminal connections referred to herein are selectively connectable by a user.

Figure 2:
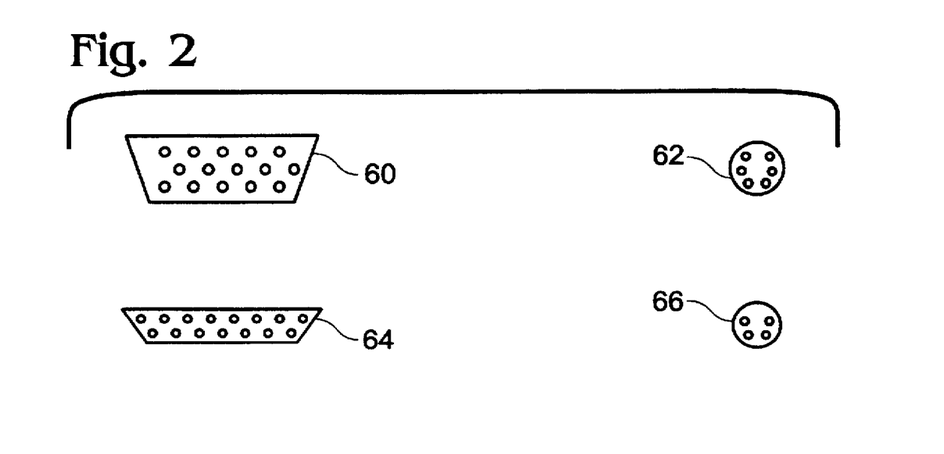
FIG. 2 shows end views of terminal configurations included in Macintosh and PC format personal computers.

FIG. 2 shows end views of video and pointer control terminal configurations used in Macintosh and PC format personal computers. Video and pointer control terminals 30 and 34 of a PC format personal computer are of, respectively, a mini DB-15 configuration 60 and a mini DIN-6 configuration 62. In contrast, video and pointer control terminals 30 and 34 of a Macintosh format personal computer are of, respectively a DB-15 configuration 64 and a mini DIN-4 configuration 66. The terminal configurations of video and pointer control source terminals 30 and 34 of Macintosh and PC format personal computers are incompatible with each other. Personal computers of both the Macintosh and PC formats employ audio source terminals 32 of the same stereo audio mini jack configuration (i.e., 3-conductor, 3.5 mm).

In accordance with the present invention, video cable 18 and pointer control cable 22 are compatible with and connectable to personal computers of both the Macintosh and PC formats. Terminal connectors 24 and 46 of video cable 18 are compatible with source terminals 30 of the respective Macintosh and PC formats. Similarly, terminal connectors 28 and 50 of pointer control cable 22 are compatible with source terminals 30 of the respective Macintosh and PC formats. As a result, cables 18 and 22 connected to a personal computer of either the Macintosh or PC formats may be similarly connected to a personal computer of the other format merely by reversing the cables.

Figure 3:
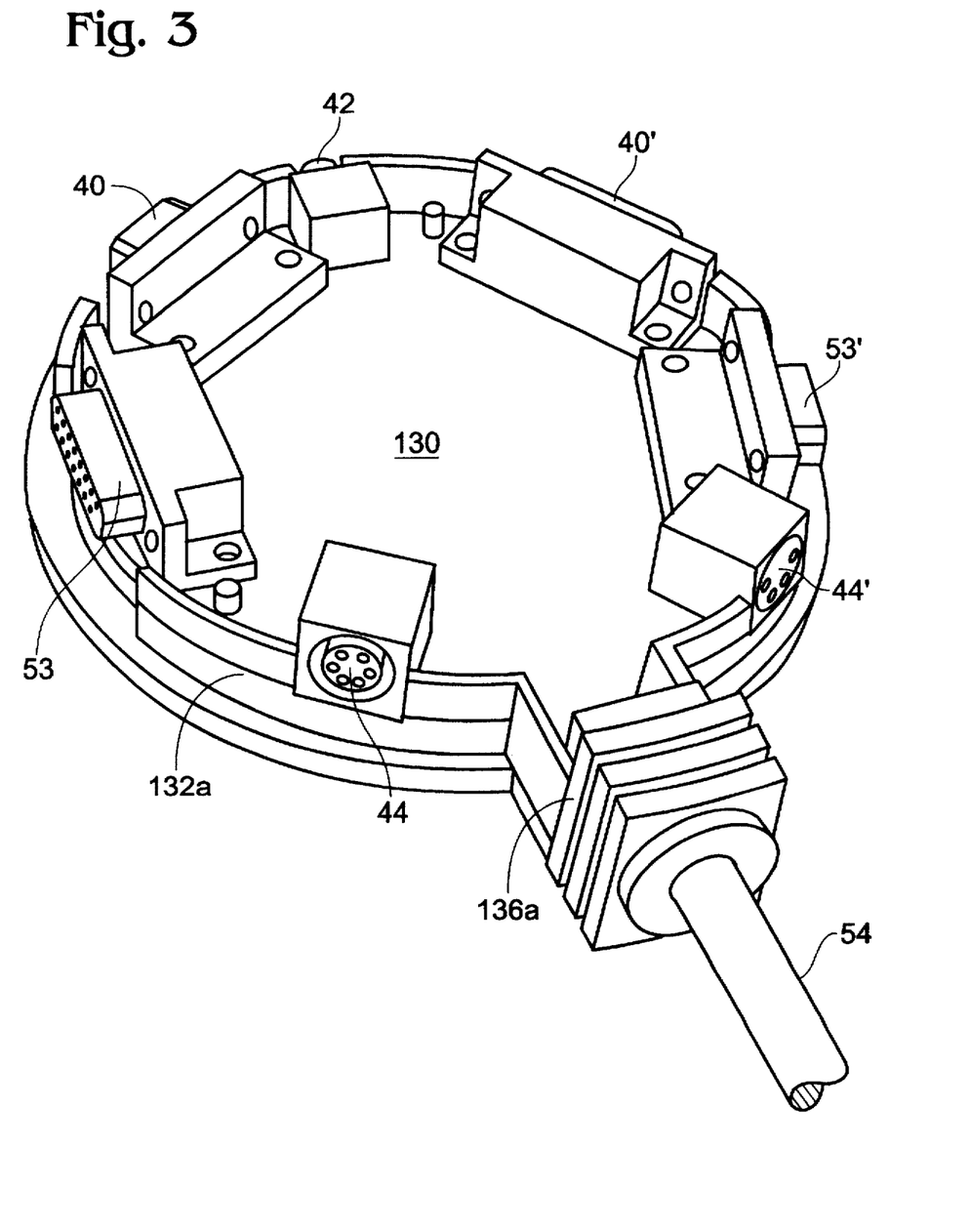
FIG. 3 is an isometric view of a base portion and terminals included in the coupling converter shown in FIG. 1.

Referring to FIGS. 1 and 3 and with multimedia source 14 being a personal computer of the Macintosh format, for example, terminal connectors 24 and 28 are configured as DB-15 and mini DIN-4 connectors for compatibility with source terminals 30 and 34, respectively. Video and pointer control terminals 40 and 44 of coupling converter 12 are of the same configuration as the corresponding source terminals of a PC format personal computer. Therefore, video and pointer control terminal connectors 46 and 50 are of the mini DB-15 configuration and the mini DIN-6 configuration, respectively.

Coupling converter 12 further includes video and pointer control terminals 40' and 44' configured to receive respective terminal connectors 24 and 28. Terminals 40' and 44' deliver signals to coupling terminal 52 in the same manner as do terminals 40 and 44. In this arrangement, video and pointer control terminal connectors 46 and 50 are compatible with and connectable to video and pointer control terminals 30 and 34 of a PC format personal computer.

In accordance with this invention, therefore, coupling converter 12 includes video and pointer control terminals matched to those of both Macintosh and PC format personal computers. Video and pointer control cables 18 and 22 each include terminal connectors matched to both Macintosh and PC format personal computers. Coupler 10 eliminates the conventional requirement for different cables or adapters for use with these two types of multimedia source 14 by providing terminals for both.

Coupling converter 12 also includes a pair of loop-through terminals 53 and 53' to either of which a personal computer display monitor 68 is connectable to receive the video signal. Loop-through terminals 53 and 53' are preferably configured, respectively, as DB-15 and mini DB-15 for compatibility with Macintosh and PC personal computer formats. Loop-through terminals 53 and 53' allow a video signal from a multimedia source 14 to be applied to both projection display system 16 and a computer monitor. Such a dual display configuration allows a user to more conveniently operate a personal computer multimedia source 14 during a projection display presentation.

Source cables 18, 20, and 22 preferably are of conventional design and each include multiple distinct conductors that are shielded together. For example, video cable 18 includes three separate conductors for carrying signals corresponding to red, green, and blue (RGB) color video components and three separate conductors corresponding to the horizontal synchronization or sync signal, the vertical sync signal, and the composite sync signal. Pointer control cable 22 carries a pointer control or mouse data conductor, a clock conductor, and pointer control power and ground conductors. Audio cable 20 includes separate left and right audio signal conductors.

Despite the shielding about such conventional cables, the complex signals carried on them are relatively sensitive to electrical noise and crosstalk and generate significant electromagnetic interference (EMI), particularly over the cable lengths of up to about 3 meters used in conventional multimedia projection display systems. To minimize this susceptibility, source cables 18, 20, and 22 are of a limited length, preferably of about 0.25–0.5 meter. As a result, coupling converter is positioned relatively close to source 14.

Figure 4:
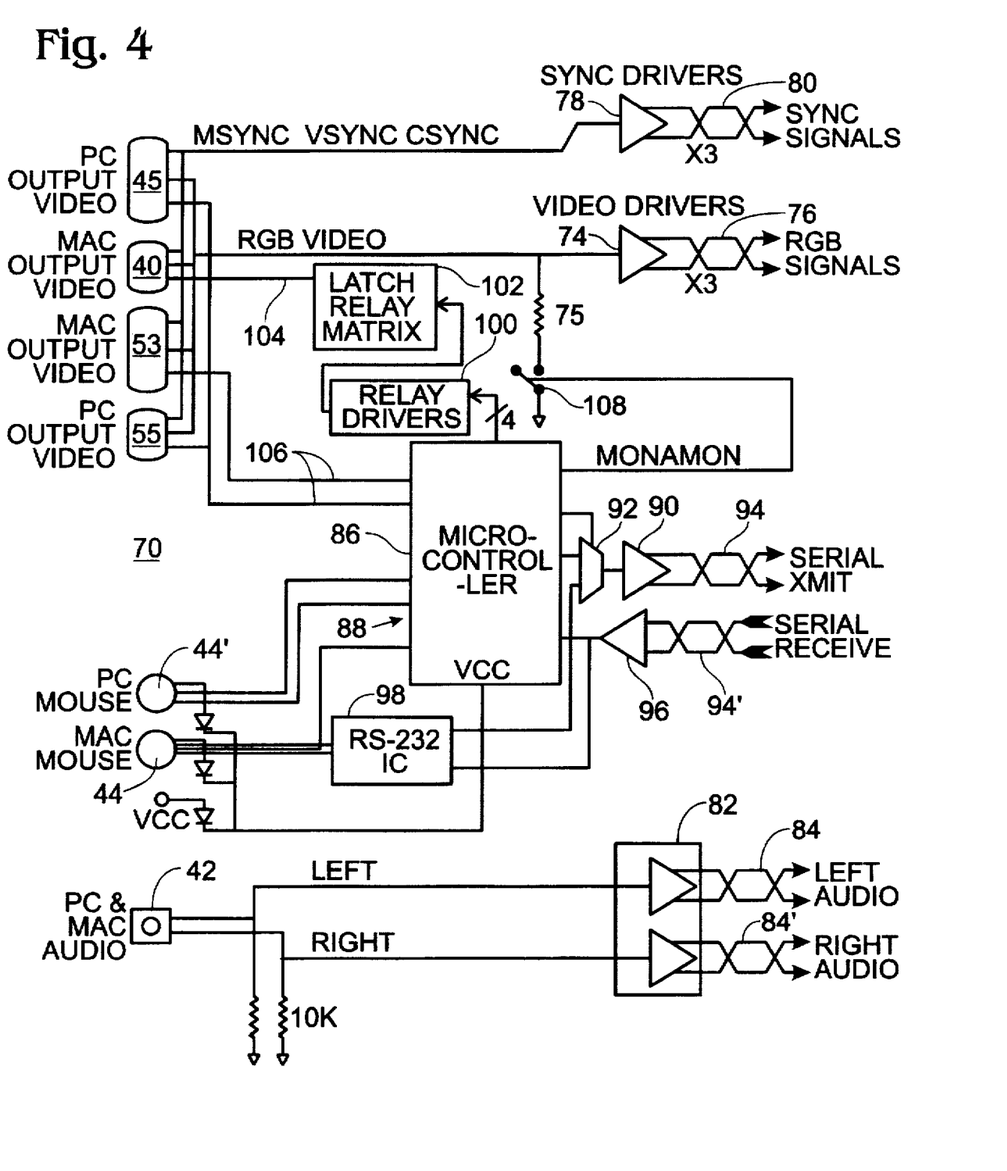
FIG. 4 is a circuit block diagram of signal format conversion circuitry included in the coupling converter of FIG. 1.

Referring to FIG. 4, coupling converter 12 includes signal format conversion circuitry 70 for converting each signal received on source cables 18, 20, or 22 into a differential format for transmission along projection system cable 54. In the differential signal format, the signals are less susceptible to electrical noise and crosstalk and generate less EMI and, therefore, provide improved display performance by multimedia projection display system 16 even if transmitted over relatively long distances of up to at least 15 meters.

Moreover, each differential format signal may be transmitted on a relatively simple, compact twisted wire pair without bulky and rigid shielding. As a result, projection system cable 54 with a length of at least 3 meters is capable of carrying all video, audio, and pointer control signals to multimedia projection display 16 while being compact, ordered, pliable, and convenient for user to manipulate. In a preferred embodiment, a projection system extension cable with a length of 12 meters is connectable between projection system cable 54 and projection display system 16. Projection display system 16 includes conventional differential receivers (not shown) for receiving each of the differential signals received from conversion circuit 70, as described below in greater detail.

Conversion circuit 70 includes a video buffer circuit 74 that receives the RGB video signals from either of video terminals 40 and 40' and generates corresponding differential RGB video signals on three twisted wire pair cables 76. Video buffer circuit 74 includes, for example, an integrated video line driver for converting the signal format of each of the RGB signals. A suitable video line driver is available as Part No. MAX435 from Maxim, Inc., of Sunnyvale, Calif.

A sync buffer circuit 78 receives the horizontal, vertical, and composite sync signals included with the video signals from either of video terminals 40 and 40' and generates corresponding differential sync signals on three twisted wire pair cables 80. Sync buffer circuit 78 includes, for example, an integrated differential driver for converting the signal format of each of the sync signals. A suitable differential driver is available as Part No. 26LS31 from National Semiconductor, Inc.

An audio buffer circuit 82 receives the left and right stereo audio signals from audio terminal 42 and generates corresponding differential audio signals on two twisted wire pair cables 84. Audio buffer circuit 82 includes, for example, an integrated audio line driver for converting the signal format of each of the right- and left-side stereo signals. A suitable audio line driver is available as Part No. SSM-2142S from Analog Devices, Inc.

Conversion circuit 70 includes a conversion circuit microcontroller 86 for controlling the general operation of conversion circuit 70 and the transmission of pointer control signals and other system control signals to and from projection display system 16. Terminals 44 and 44' receive pointer control signals of Apple Data Bus (ADB) or PS/2 formats used by respective Macintosh and PC format personal computers. The pointer control signals are delivered to inputs 88 of microcontroller 86 for conversion into a serial data format for transmission to projection display system 16.

A differential transmitter 90 receives the serial format pointer control signals from a multiplexer 92 and transmits them in a differential signal format on a twisted wire cable 94 to multimedia projection display system 16. An RS-422 receiver 96 receives differential format pointer control signals on a twisted wire pair cable 94' from projection display system 16 and converts the signals to a non-differential serial data format for delivery to microcontroller 86. Differential transmitter 90 includes, for example, a differential driver available as Part No. 26LS31 from National Semiconductor, Inc., and RS-422 receiver 96 includes, for example, a conventional integrated RS-422 transceiver circuit available as Part No. 75176 from National Semiconductor, Inc.

Conversion circuit 70 receives power from projection display system 16 via power conductors included in system cable 54. As is known in the art, a pointer device typically must be powered upon start-up of a controlling personal computer to be operable. With conversion circuit 70 powered by projection display system 16, a personal computer source 14 that is powered before projection display system 16 could suffer an inoperable pointer device condition.

To eliminate such a power sequence dependency, microcontroller 86 alternatively receives power from personal computer source 14 of either format on the power conductor included in pointer control cable 22. In a similar regard, loop-through terminals 53 and 53' preferably are coupled directly to respective video terminals 40 and 40' so that a computer monitor can receive the video signals and render a video display independent of whether conversion circuit 70 receives power from projection display system 16. In contrast, a conventional loop-through coupling for a projection display system is indirect in that the coupling passes through a buffer circuit and is, therefore, inoperable whenever the projection display system does not receive power.

As described above, pointer control terminals compatible with the PC format are of the mini DIN-6 configuration 62 (FIG. 2), but utilize only four of the six available terminal pins. In accordance with an alternative embodiment of this invention, the two otherwise unused terminal pins of pointer control terminal 44 transmit and receive serial data representing control and diagnostic signals for projection display system 16.

The control and diagnostic signals typically would be used by manufacturing and service personnel during the respective manufacture and repair of projection display system 16. An RS-232 data transceiver circuit 98 controls the data communications. RS-232 data transceiver circuit 98 includes, for example, a conventional integrated RS-232 interface circuit available as Part No. MAX232A from Maxim Integrated Circuits, Inc. Conventional users would not utilize the control and diagnostic signals because they would not be supported by a pointer control terminal 34 of a conventional PC format personal computer.

Personal computers and personal computer monitors are capable of displaying video images in a variety of video display formats. One aspect of conventional operation of personal computers is matching the video display format of the video signal generated by a personal computer with the video display format of an associated display monitor.

Conversion circuit 70 provides automatic video display format matching between a personal computer multimedia source 14 and a projection display system 16.

Some personal computers are capable of generating video signals in a variety of video display formats. In this regard, a personal computer detects from the display monitor a video format identifier representing the video display format of the monitor. In response to the video format identifier, the personal computer configures its video signals according to the display format of the display monitor. Conversion circuit 70 provides automatic video display format matching in a similar manner for Macintosh format personal computers.

After system cable 54 is coupled to projection display system 16 and it is activated, system control signals are transmitted between microcontroller 86 and projection display system 16 as described above to determine its display format. Projection display system 16 may have any of a variety of display formats including, but not limited to, color or monochrome and display pixel resolutions of 640×480, 800×600, 1024×768, and 1280×1024. Microcontroller 86 receives the display format information from projection display system 16 and provides a corresponding video format identifier representing the video display format to a set of drivers 100 for controlling a set of latching relays 102.

Being of the Macintosh format, video terminal 40 includes video format identifier outputs 104 for delivering the video format identifier to a Macintosh format source 14. In response to the video format identifier on video identifier outputs 104, a Macintosh format source 14 generates its video signal in a format matched to the display format of projection display system 16. Once established, the video format identifier is held in a non-volatile manner on latching relays 102. A benefit of the non-volatile operation of latching relays 102 is that after they are set by an initial cycle, they provide the video format identifier to a Macintosh format source 14 independently of whether conversion circuit 70 is powered. This eliminates another power sequence dependency characteristic of conventional projection display systems.

It will be appreciated that the display pixel resolutions of multimedia source 14 and projection display system 16 might not be identical. For example, Macintosh format personal computers typically have display pixel resolutions of, for example, 640×480, 832×624, and 1152×870. Under these circumstances, the matching of display formats includes selecting a display format of video signals from multimedia source 14 that provides the best fit to the display format of projection display system 16. Table 1 lists the display formats from a Macintosh format source 14 selected for particular display formats of projection display system 16.

TABLE 1

| Projection System Display Format | Macintosh Source Display Format |
|---|---|
| 640 × 480 | 640 × 480 |
| 800 × 600 | 832 × 624 |
| 1024 × 768 | 1152 × 870 |
| 1280 × 1024 | 1152 × 870 |

Display monitors for both Macintosh and PC format personal computers provide video format identifiers. The corresponding video format identifiers of any computer monitor coupled to loop-through terminals 53 and 53' are delivered to inputs 106 of microcontroller 86. Microcontroller 86 detects the presence of the computer monitor based on the presence of any video format identifiers at inputs 106. Whenever it detects that no monitor is coupled to loop-through terminals 53 or 53', microcontroller 86 closes a video termination switch 108 to properly terminate the video signal received from source 14. Whenever it detects a monitor coupled to loop-through terminals 53 or 53', microcontroller 86 opens video termination switch 108 so that the video signal is terminated in the loop-through monitor.

With reference to FIGS. 5–8, coupling converter 12 includes a circular base 130 with a cylindrical side wall 132a extending vertically upward from the periphery of base 130. A cap 134 (shown alone in FIG. 8) includes a cylindrical side wall 132b extending vertically downward from the periphery of cap 134. Cap 134 fits over base 130 so that side walls 132a and 132b meet in aligned engagement. Base 130 and cap 134 include, respectively, upper and lower coupling housings 136a (FIG. 3) and 136b (FIG. 8) extending transversely from side walls 132a and 132b and aligned with coupling terminal 52 (FIG. 1) to receive system cable 54.

Cap 134 includes a circular flange 138 that is positioned over side wall 132b and extends inwardly and upwardly at an oblique angle therefrom. The radially inner edge 137 of flange 138 bounds a circular recessed surface 140 of smaller diameter than and concentric with the circular base 130. A cover 142 (FIGS. 5–7) fits over cap 134 and is rotatable so a user can selectively access a first set of terminal ports 144 housing terminals 40, 44, and 53 for a Macintosh format personal computer or a second set of terminal ports 146 housing terminals 40', 44', and 53' for a PC format personal computer.

Figure 5:
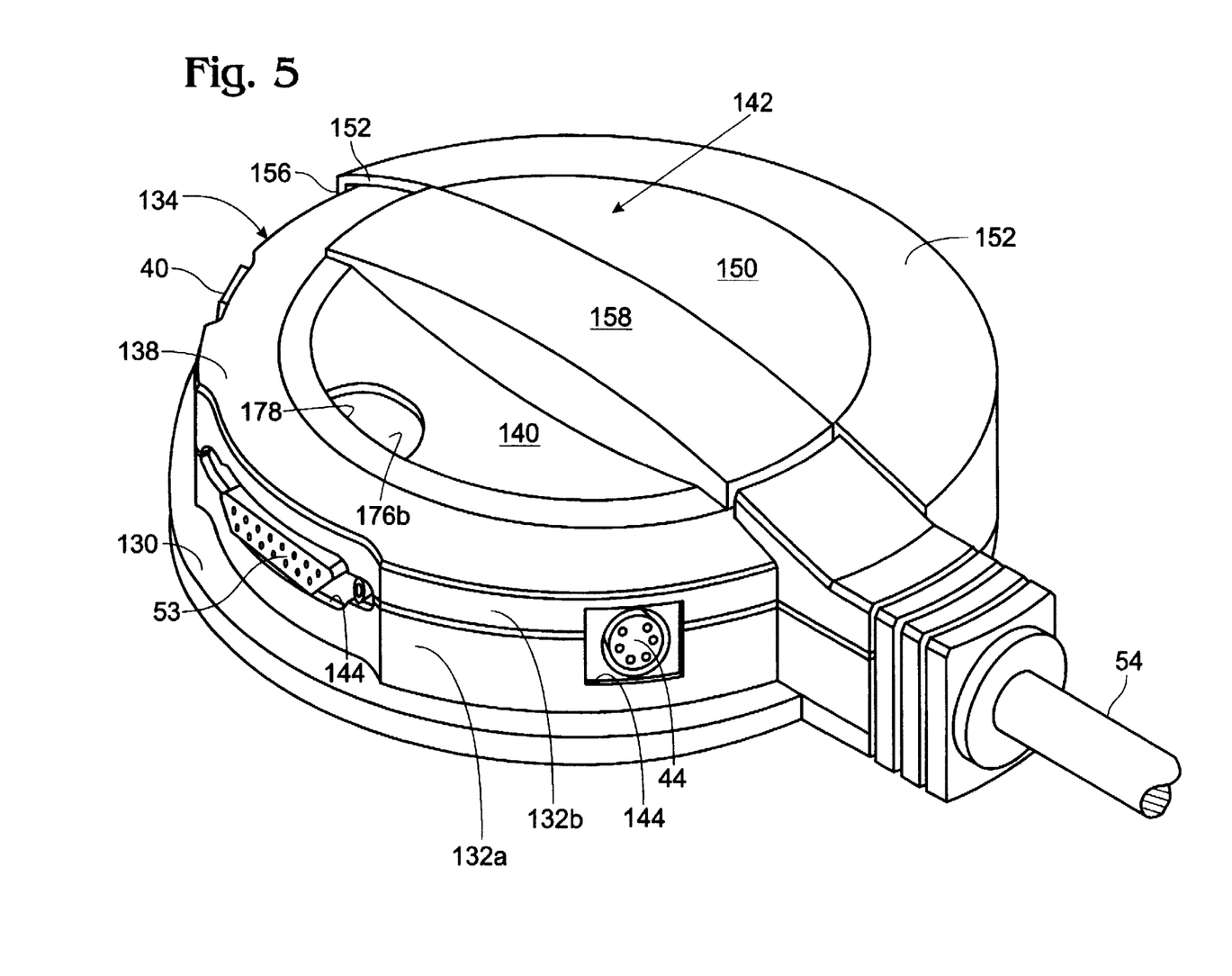
FIG. 5 is a first top isometric view of the coupling converter shown in FIG. 1, oriented to show a first set of terminals.
Figure 6:
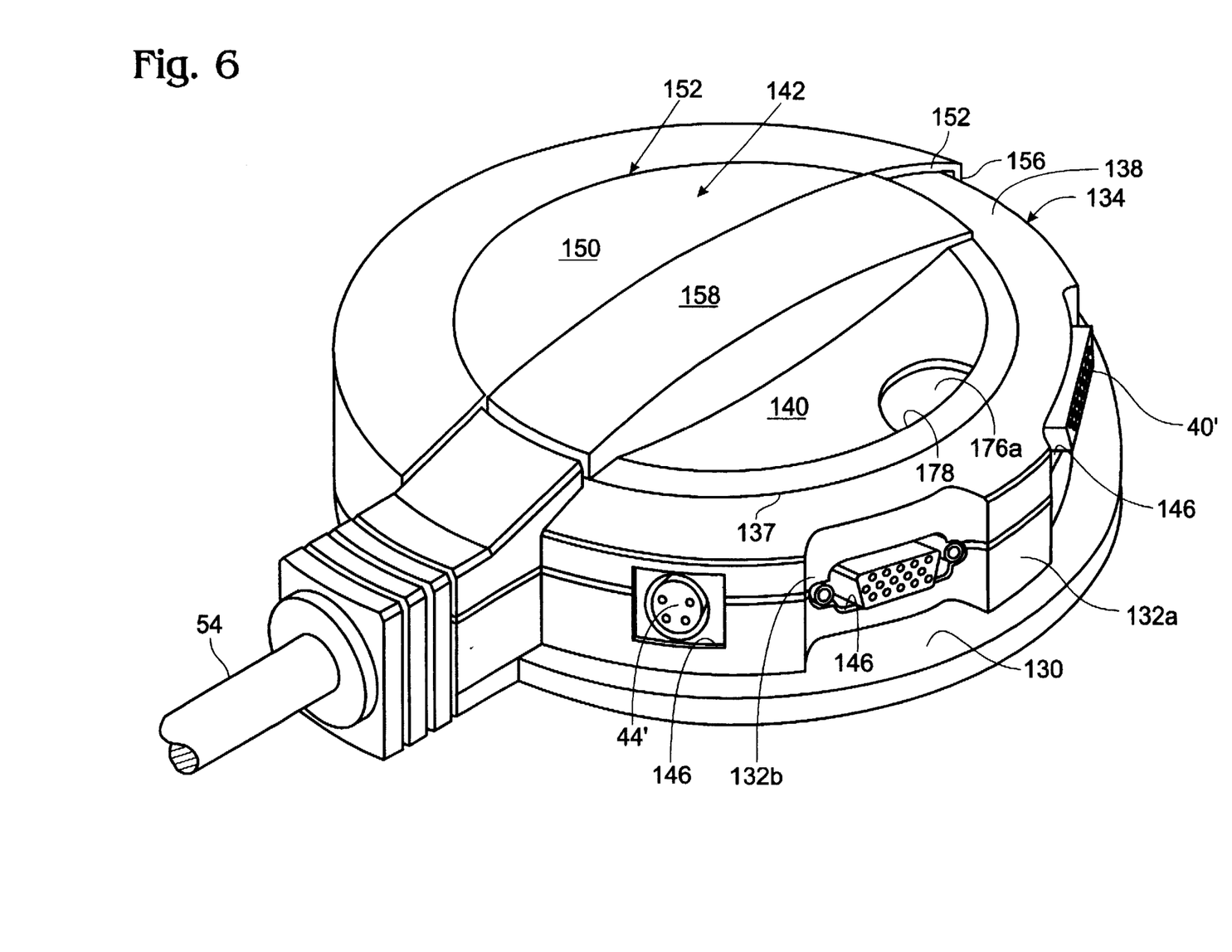
FIG. 6 is a second top isometric view of the coupling converter shown in FIG. 1, oriented to show a second set of terminals.
Figure 7:
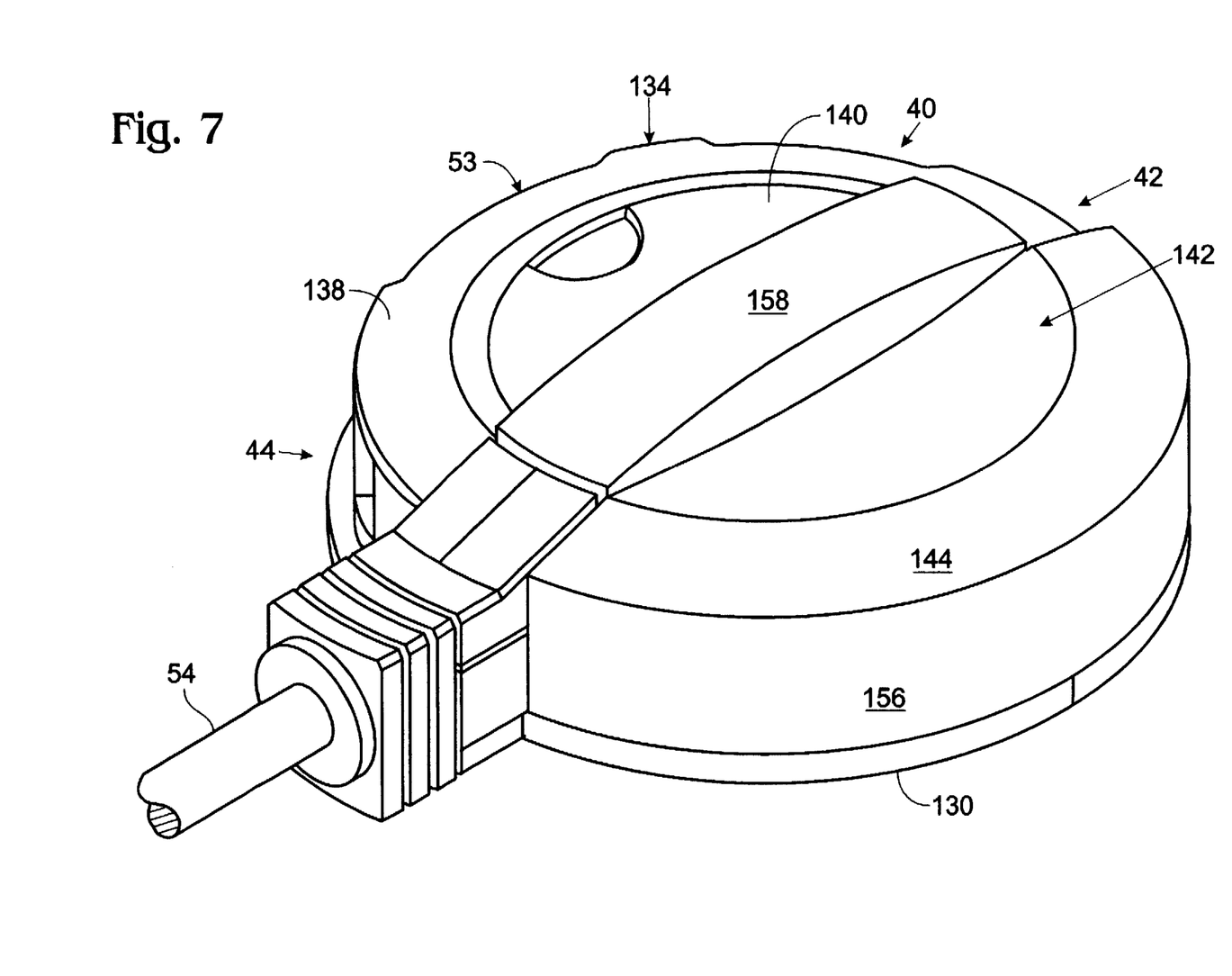
FIG. 7 is a top isometric view of the coupling converter as shown in FIG. 6, but with the cover rotated to block the set of terminals shown in FIG. 6.

Rotatable cover 142 has a circular central cap portion 150 that is complementary with the circular recessed surface 140. A semi-circular flange portion 152 extends radially from central cap portion 150 and is complementary with approximately one-half of circular flange 138. A semi-cylindrical side wall cover 156 depends downwardly from flange portion 152 to cover about one-half of cylindrical sidewall 132 of base 130. An elongated handle 158 extends diametrically across central cap portion 150.

Figure 8:
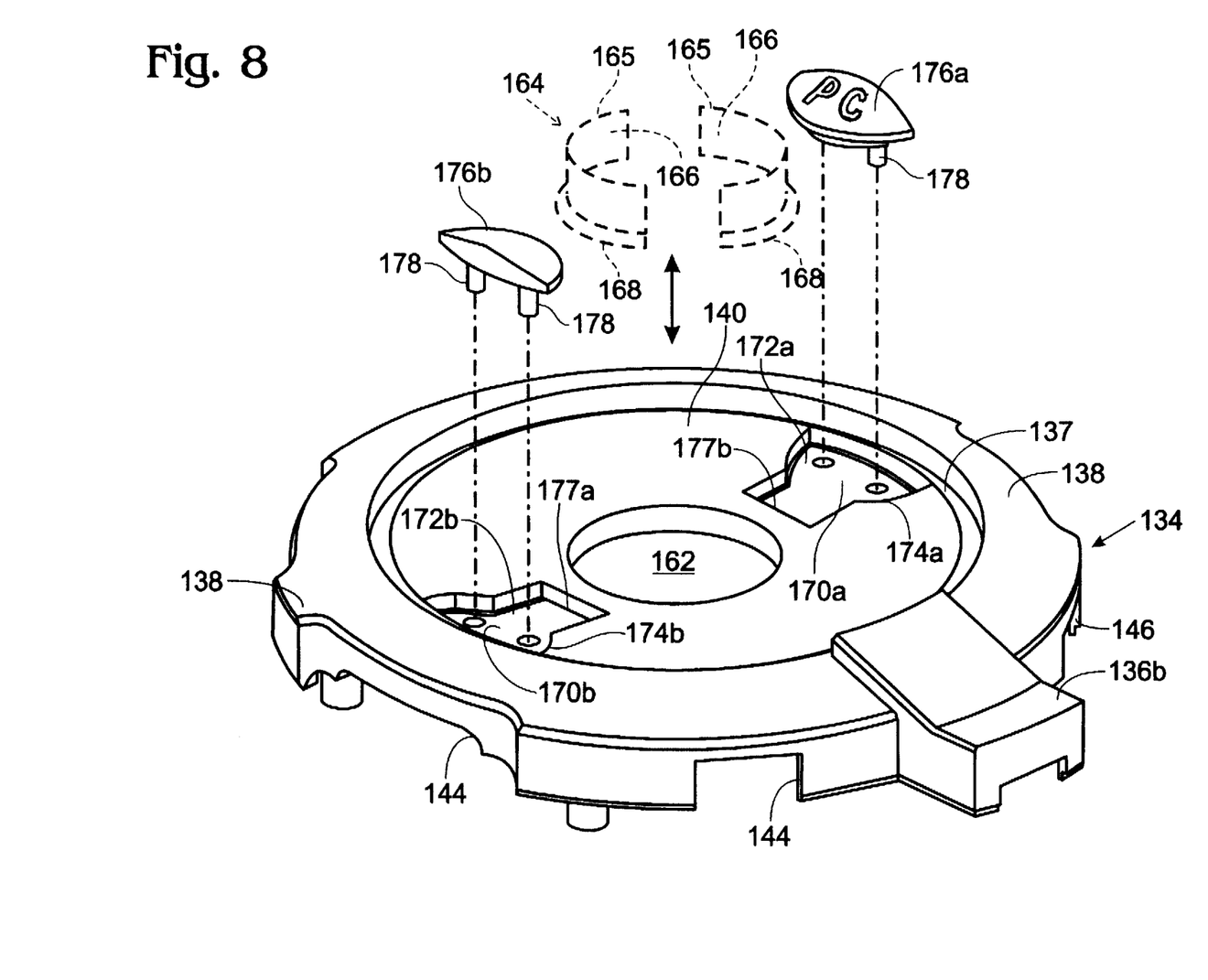
FIG. 8 is an exploded top isometric view of a cap portion of the coupling converter as shown in FIGS. 5–7.

Referring to FIG. 8, recessed surface 140 of cap 134 has at its center a circular aperture 162 for receiving a complementary attachment flange 164 (shown detached and in outline) that extends from the center of a bottom surface (not shown) of cover 142 opposite its top surface shown in FIGS. 5–7. Attachment flange 164 includes a base 165 which preferably is integral with the bottom surface of cover 142, and a pair of semicircular tabs 166 with radially extending lips 168. Tabs 166 extend through circular aperture 162 and are held in rotatable engagement with it by lips 168, which have an outer diameter greater than the inner diameter of aperture 162. During assembly, tabs 166 are deflected radially inwardly as lips 168 pass through aperture 162 and then snap back to their normal positions.

Recessed surface 140 also includes radially-extending detent tabs 170a and 170b that are positioned at diametrically opposed margins and set within recesses 172a and 172b, respectively. Recesses 172a and 172b include semi-circular portions 174a and 174b for receiving detents 176a and 176b having rounded convex profiles. Tabs 170a and 170b are resiliently fixed to, and preferably integral with, cap 134 at their respective base ends 177a and 177b and function as leaf-type hinges or springs for resiliently supporting detents 176a and 176b.

Preferably, detents 176a and 176b are oriented in opposite diametrical directions and are labeled to designate the type of terminals that are accessible for the particular rotational position of cover 142. For example, one detent 176a may have molded into it a "PC" logo, and the other detent 176b may have molded into it a "Mac™" logo (not shown). Each detent has a pair of pegs 178, one of relatively small diameter and the other of relatively large diameter, that fit into a pair of complementary holes defined in the detent tabs 170a and 170b. The order of the small- and large-diameter pegs 178 of the "PC" logo detent 176a are reversed from that of the "Mac™" logo detent 176b so that the "PC" logo detent 176a is only mountable on detent tab 170a (adjacent the PC format terminals 40', 44' and 53') and the "Mac™" logo detent 176b is only mountable on detent tab 170b (adjacent the Macintosh format terminals 40, 44 and 53). It is to be understood that the above type and positioning of the terminals and the logo detents are exemplary only and may be different as appropriate for other multimedia sources.

As shown in FIGS. 5 and 6, side wall cover 156 selectively blocks terminals 40, 44 and 53 or terminals 40', 44', and 53' according to the rotational position of cover 142. According to such position, detents 176a and 176b engage complementary structures on cover 142, one defining a detent viewing aperture 178 and one defining a shallow detent recess (not shown) in the bottom surface of the cover 142. The concave surfaces of the detents 176a and 176b each snap into one of the viewing aperture 178 and the detent recess to secure the cover 142 in place. The "PC" logo detent 176a is visible through viewing aperture 178 when terminals 40', 44', and 53' are accessible, and the "Mac™" logo detent 176b is visible through viewing aperture 178 when terminals 40, 44, and 53 are accessible. Audio terminal 42 is common to both Macintosh and PC format personal computers and therefore is positioned between and included with both sets of terminals.

Side wall cover 156 functions to facilitate use of coupling converter 12 by blocking all terminals not compatible with the particular multimedia source being used. A user accesses the terminals compatible with a particular multimedia source 14 by rotating cover 142 into the appropriate position. The personal computer format of the terminals that are accessible by a selected position of side wall cover 156 is indicated by the logo on whichever detent 176a, 176b is visible through viewing aperture 178. Audio terminal 42 is common to both Macintosh and PC format personal computers and therefore is positioned between and included with both sets of terminals.

It will be appreciated that coupling converter 12 shown in FIGS. 5-8 includes functional features according to the present invention, as well as ornamental features that are independent of the functional ones. The inclusion of the ornamental features of coupling converter 12 in FIGS. 5-8 is merely for purposes of clarity.

Coupling converter 12 provides improved coupling of multiple media signals between a multimedia source 14 and projection display system 16. Under some circumstances, users sometimes wish to use only video signals between multimedia source 14 and projection display system 16. In these situations, coupling converter 12 is relatively cumbersome. To accommodate such users, a simplified coupling of the present invention (not shown) includes a PC (or Macintosh) format video terminal 24, a conventional cable for carrying the video signal generated by multimedia source 14, and a projection system connector 56 for coupling to terminal 58 of projection display system 16.

As described above, projection display system 16 preferably includes differential receivers matched to the corresponding differential drivers in conversion circuit 70 for receiving the differential signals therefrom. With the simplified coupling of the present invention, the video signal from multimedia source 14 does not pass through conversion circuit 70 and is not in differential form. Accordingly, the differential receivers of projection display system 16 modify the processing of the video signal so it is in an appropriate format. The following description is directed to specific exemplary differential receivers, but may be implemented in various ways as is known in the art.

More specifically, different differential receivers modify the processing of the video signal in different ways. The differential receivers matched to the exemplary differential video line drivers of video buffer circuit 74 described above automatically modify their output according to whether they receive differential or non-differential format signals. The differential receivers matched to the exemplary differential drivers of sync buffer circuit 78 described above do not operate in such an automatic manner.

The sync signal differential receivers generate outputs according to the status of a differential/non-differential control input. Projection system cable 54, its extension cable, and the simplified coupling each include a pair of cable identifier pins in their terminal connectors tied to identifying logic states.

Table 2 lists exemplary logic states used with the cable identifier pins for projection system cable 54 and its extension and substitute. Logic state 1 indicates an open circuit condition an identifier pin, and logic state 0 indicates that the identifier pin is tied to ground.

TABLE 2

| Identifier Pin 1 | Identifier Pin 0 | Cable Coupling |
| --- | --- | --- |
| 0 | 0 | Extension cable |
| 0 | 1 | Projection system cable |
| 1 | 0 | Simplified (substitute) cable |
| 1 | 1 | No coupling |

Based on the logic states of the identifier pins, projection display system 16 can identify the type of cable connection and operate accordingly. For example, with their differential/non-differential control inputs tied to identifier pin 1, the sync signal differential receivers are capable of processing correctly video signals of either format.

Although described with reference to particular personal computer format multimedia sources, the present invention is similarly applicable to a wide variety of other multimedia sources can be used, including other computer formats (e.g., any of various workstation formats), a television-format source including direct broadcast, recorded (e.g., video cassette recorder (VCR) or laser disk), and any audio signal source. Multimedia projection display system 16 could alternatively be any other multimedia projection display system using multiple media signals as described herein. Moreover, although three source cables are shown and are preferred, the system can be adapted to use any number of source cables.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents thereto.

We claim:

1. A multimedia coupling apparatus for interconnecting a multimedia display system and a multimedia source, comprising:

first and second source cables extendable from the multimedia source for carrying signals corresponding to different first and second media, respectively;

a coupling converter having first and second terminals in communication with a third terminal, the first and second terminals being connectable to the first and second source cables for carrying to the third terminal signals corresponding to the respective first and second media; and a single display system cable extendable from the third terminal of the coupling converter to the multimedia display system for carrying signals corresponding to the first and second media.

2. The apparatus of claim 1 in which the multimedia source is one of first and second multimedia source configurations having incompatible first and second cable terminal formats and at least one of the first and second cables has at its opposed ends cable terminal connectors of the first and second cable terminal formats, whereby the at least one of the first and second cables is connectable to the coupling converter and a multimedia source of either of the first and second multimedia source configurations.

3. The apparatus of claim 1 in which the display system cable includes first and second twisted wire pairs for carrying for the signals corresponding to the first and second media, respectively.

4. The apparatus of claim 3 in which the coupling converter includes differential signal generating means receiving the signals corresponding to the first and second media carried on the first and second source cables for generating corresponding first and second differential signals, respectively.

5. The apparatus of claim 1 in which the multimedia display system has one of multiple predetermined display resolutions and the coupling converter includes a converter control system operable to sense the display resolution of the multimedia display system and communicate corresponding display resolution information to the multimedia source.

6. The apparatus of claim 5 in which the converter control system holds the display resolution information in a non-volatile memory available to the multimedia source upon coupling it with the coupling converter.

7. The apparatus of claim 1 in which the first and second source cables have source cable lengths, the display system cable has a display system cable length, and the source cable lengths are less than the display system cable length.

8. A multimedia display system coupling apparatus for interconnecting a multimedia display system and a multimedia source, the multimedia source is one of first and second multimedia source configurations having incompatible first and second cable terminal formats, the improvement comprising:

first and second source cables extendable from the multimedia source for carrying signals corresponding to different first and second media, respectively, each of the first and second source cables having at its opposed ends cable terminal connectors of the first and second cable terminal formats;

a coupling converter having first and second pairs of terminals in communication with a third terminal, the first pair of terminals being connectable to either terminal connector of the first source cable and the second pair of terminals being connectable to either terminal connector of the second source cable; and a display system coupling from the coupling converter to the multimedia display system for carrying signals corresponding to the first and second media from the third terminal to the multimedia display system.

9. The apparatus of claim 8 in which the display system coupling is a single display system cable extendable from the coupling converter to the multimedia display system for carrying signals corresponding to the first and second media from the third terminal to the multimedia display system.

10. The apparatus of claim 9 in which the display system cable includes first and second twisted wire pairs for carrying for the signals corresponding to the first and second media, respectively.

11. The apparatus of claim 9 in which the first and second source cables have source cable lengths, the display system cable has a display system cable length, and the source cable length are less than one-sixth the display system cable length.

12. The apparatus of claim 8 in which the coupling converter includes differential signal generating means receiving the signals corresponding to the first and second media carried on the first and second source cables for generating corresponding first and second differential signals, respectively.

13. The apparatus of claim 8 in which the multimedia display system has one of multiple predetermined display resolutions and the coupling converter includes a converter control system operable to sense the display resolution of the multimedia display system and communicate corresponding display resolution information to the multimedia source.

14. The apparatus of claim 13 in which the converter control system holds the display resolution information in a non-volatile memory available to the multimedia source upon coupling it with the coupling converter.

15. The apparatus of claim 8 in which first and second multimedia source configurations are based upon distinct personal computer formats.

16. The apparatus of claim 8 in which the multimedia display system includes a LCD projector or a LCD projection panel.

17. The apparatus of claim 8 in which the display system coupling has a length greater than 3 meters.

18. In a multimedia coupling apparatus for interconnecting a multimedia display system and a multimedia source, the multimedia source for providing a video signal corresponding to video display imagery, the improvement comprising:

a video differential signal generation circuit receiving the video signal provided by the multimedia source and generating a corresponding differential video signal for improved transmission to the multimedia display system.

19. The apparatus of claim 18 further comprising a twisted wire pair for carrying for the differential video signal to the multimedia display system.

20. The apparatus of claim 19 in which the twisted wire pair has a length greater than 3 meters.

21. The apparatus of claim 18 in which the multimedia source further provides a system control signal for controlling the multimedia display system, the apparatus further comprising:

a system control differential signal generating circuit receiving the system control signal provided by the multimedia source and generating a corresponding differential system control signal for controlling the multimedia display system.

22. The apparatus of claim 20 in which the system control signal includes a pointer control signal.

23. The apparatus of claim 21 further comprising a video twisted wire pair for carrying for the differential video signal to the multimedia display system and a system control twisted wire pair for carrying for the differential system control signal to the multimedia display system.

24. In a multimedia projection coupling apparatus for interconnecting a multimedia projection display system and a multimedia source for providing a video signal to the multimedia projection display system, which has a video display format, the multimedia source also having a display terminal connected thereto, the improvement comprising:

a video display format identifier for detecting the video display format of the multimedia projection display system; and a video display format identifier for identifying to the multimedia source a matching video display format corresponding the video display format of the multimedia projection display system while the display terminal is connected to the multimedia source.

25. The apparatus of claim 24 in which the video display format identifier holds the matching video display format in a non-volatile memory available to the multimedia source.

26. A multimedia projection coupling apparatus for interconnecting a multimedia projection display system and a multimedia source, the multimedia source being one of first and second multimedia source configurations having incompatible first and second cable terminal formats, the improvement comprising:

a coupling converter having first and second terminals in communication with a third terminal and a terminal access panel for providing access to the first and second terminals alternatively, the first and second terminals being compatible with the respective first and second cable terminal formats and the third terminal being connectable to the multimedia projection display system.

27. In a multimedia projection coupling apparatus for interconnecting a multimedia projection display system and a multimedia source for providing a video signal to the multimedia projection display system, the improvement comprising:

a coupling cable for carrying the video signal between the multimedia source and the multimedia projection display system, the coupling cable having a twisted wire pair and having a length greater than 3 meters.

28. The apparatus of claim 27 in which the coupling cable has a length less than 15 meters.

29. The apparatus of claim 1 in which the multimedia display system is a multimedia projection display system.

30. The apparatus of claim 8 in which the multimedia display system is a multimedia projection display system.

31. The apparatus of claim 18 in which the multimedia display system is a multimedia projection display system.

32. The apparatus of claim 24 in which the multimedia display system is a multimedia projection display system.

33. A multimedia coupling apparatus for interconnecting a multimedia display system and a multimedia source, the multimedia source being one of first and second multimedia source configurations having incompatible first and second cable terminal formats, comprising:

a coupling apparatus base having a first set of terminal ports defined therein for housing a first set of terminals connectable to a multimedia source of the first multimedia source configuration, and a second set of terminal ports defined therein for housing a second set of terminals connectable to a multimedia source of the second multimedia source configuration; and a cover movably mounted on the coupling apparatus base and having a first position wherein the first set of terminal ports are blocked and the second set of terminal ports are exposed, and a second position wherein the first set of terminal ports are exposed and the second set of terminal ports are blocked.

34. The coupling apparatus of claim 33, wherein the cover is rotatably mounted on the coupling apparatus base.

* * * * *